US011720674B2

(12) United States Patent
Villegas

(10) Patent No.: US 11,720,674 B2
(45) Date of Patent: Aug. 8, 2023

(54) SYSTEMS AND METHODS FOR MALWARE DETECTION

(71) Applicant: Carlos A. Villegas, Redondo Beach, CA (US)

(72) Inventor: Carlos A. Villegas, Redondo Beach, CA (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 122 days.

(21) Appl. No.: 17/160,701

(22) Filed: Jan. 28, 2021

(65) Prior Publication Data

US 2022/0237290 A1 Jul. 28, 2022

(51) Int. Cl.
*G06F 21/64* (2013.01)
*G06F 21/56* (2013.01)
*G06F 12/14* (2006.01)

(52) U.S. Cl.
CPC ............ *G06F 21/563* (2013.01); *G06F 12/14* (2013.01); *G06F 21/64* (2013.01); *G06F 2212/1052* (2013.01); *G06F 2221/034* (2013.01)

(58) Field of Classification Search
CPC ....... G06F 2221/034; G06F 2212/1052; G06F 21/64; G06F 12/14; G06F 21/563
USPC .......................................................... 726/24
See application file for complete search history.

(56) References Cited

U.S. PATENT DOCUMENTS

2008/0270855 A1* 10/2008 Bae ..................... G06F 11/0751 714/E11.002
2011/0265182 A1* 10/2011 Peinado ................ G06F 21/566 711/E12.001
2013/0111591 A1* 5/2013 Topan ................. H04L 63/1408 726/24
2015/0019915 A1* 1/2015 Kospiah ................ G06F 21/566 714/38.1
2015/0052616 A1 2/2015 Hutchison et al.

(Continued)

FOREIGN PATENT DOCUMENTS

WO 2006/116871 A2 11/2006
WO 2013/101083 A1 7/2013

OTHER PUBLICATIONS

Extended European Search Report dated May 27, 2022.

*Primary Examiner* — Josnel Jeudy
(74) *Attorney, Agent, or Firm* — Tarolli, Sundheim, Covell & Tummino LLP

(57) ABSTRACT

In some examples, an analyzer manager configured to select one of a program code analyzer, a static data analyzer, and an unused memory location analyzer for malware detection within memory of a system. The program code analyzer can be executed to evaluate instruction data for executing a computer program at a first set of memory locations within the memory for malware in response to being selected by the analyzer manager. The static data analyzer can be executed to evaluate static data for use by the computer program at a second set of memory locations within the memory for the malware in response to being selected by the analyzer manager. The unused memory location analyzer can be executed to evaluate null data indicative of unused memory locations at a third set of memory locations within the memory for the malware in response to being selected by the analyzer manager.

13 Claims, 6 Drawing Sheets

(56) References Cited

U.S. PATENT DOCUMENTS

2016/0011992 A1* 1/2016 Sandoz ................ G06F 3/0622
    711/163
2018/0089422 A1* 3/2018 Kounavis .............. G06F 21/563
2022/0222343 A1* 7/2022 Dubrovsky ............. G06F 21/53

* cited by examiner

SYSTEMS AND METHODS FOR MALWARE DETECTION

GOVERNMENT INTEREST

The invention was made under Government Contract Number FA8810-18-C 0006. Therefore, the US Government has rights to the invention as specified in that contract.

TECHNICAL FIELD

The present disclosure relates to systems and methods for detecting malware. In some examples, the present disclosure relates to malware detection onboard weapon systems.

BACKGROUND

Malware is any software intentionally designed to cause damage to a computer, a server, a client, or a computer network. A wide variety of malware types exist, including computer viruses, worms, Trojan horses, ransomware, spyware, adware, rogue software, wiper, and scareware. Memory-resident malware or fileless malware is a type of malware that inserts itself into a computer or a device in a particular way, loading its own program into permanent memory, such as readable access memory (RAM). To analyze malware, static and dynamic analysis techniques are used. Static malware analysis involves examining any given malware sample without actually running or executing the code. This is usually done by determining the signature of the malware binary; the signature is a unique identification for the binary file. Dynamic malware analysis, unlike static malware analysis, involves analysis while running the code in a controlled environment. The malware is run in a closed, isolated sand box environment and then its behavior is studied.

SUMMARY

The present disclosure relates to systems and methods for detecting malware.

In an example, a malware detector can include an analyzer manager that can be configured to select one of a program code analyzer, a static data analyzer, and an unused memory location analyzer for malware detection within memory of a system based on analyzer execution data. The analyzer execution data can characterize a schedule for execution of the program code, the static data, and the unused memory location analyzers during a runtime of a computer program. The program code analyzer can be executed to evaluate instruction data for executing the computer program at a first set of memory locations within the memory for malware in response to being selected by the analyzer manager. The static data analyzer can be executed to evaluate static data for use by the computer program at a second set of memory locations within the memory for the malware in response to being selected by the analyzer manager. The unused memory location analyzer can be executed to evaluate null data indicative of unused memory locations within the memory at a third set of memory locations within the memory for the malware in response to being selected by the analyzer manager.

In yet another example, a system can include memory to store machine readable instructions and analyzer execution data characterizing a schedule for execution of program code, static data, and unused memory location analyzers during runtime of a computer program, and one or more processors to access the memory and execute the machine readable instructions. The machine readable instructions can include an analyzer manager programmed to select one of the program code analyzer, the static data analyzer, and the unused memory location analyzer for malware detection within the memory based on the analyzer execution data. The program code analyzer can be programmed to evaluate instruction data for executing the computer program at a first set of memory locations within the memory for malware in response to being selected by the analyzer manager. The static data analyzer can be programmed to evaluate static data for use by the computer program at a second set of memory locations within the memory for the malware in response to being selected by the analyzer manager. The unused memory location analyzer can be programmed to evaluate null data indicative of unused memory locations within the memory at a third set of memory locations within the memory for the malware in response to being selected by the analyzer manager.

In a further example, during a first period of time, a method can include executing a hash function on instruction data for executing a computer program and comparing the hash of the instruction data to an expected hash for the instruction data to determine whether instruction data has been compromised by malware. The instruction data can be stored at a first set of memory locations within memory. During a second period of time, the method can include executing a hash function on static data for use by the computer program and comparing the hash of the static data to an expected hash for the static data to determine whether the static data has been compromised by the malware. The static data can be stored at a second set of memory locations with the memory. During a third period of time, the method can include executing a hash function on null data indicative of unused memory locations within the memory and comparing the hash of the null data to an expected hash for the null data to determine whether the null data has been compromised by the malware. The null data can be stored at a third set of memory locations with the memory.

DETAILED DESCRIPTION

Figure 1:
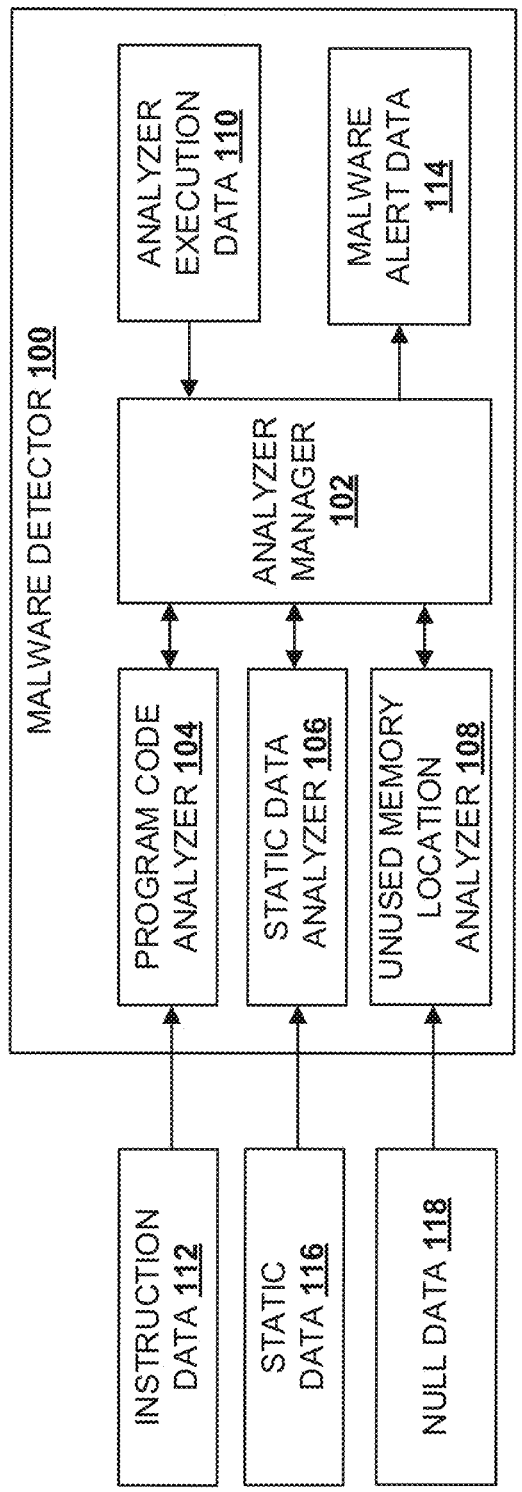
FIG. 1 is an example of a malware detector.

The present disclosure relates to systems and methods for detecting malware. Malware can infect systems and reduce or inhibit of performance of such systems, which can lead to unwanted system performance or compromise. For example, a cyber-attack can be launched on a system that may have access to a network. If the cyber-attack is successful, the system can be compromised, which can lead to system failures or in some instances to a loss of life. Systems that have limited amount of computing resources and are exposed to a network (e.g., a computer network, a satellite network, wireless network, wired network, and the like) are vulnerable to being compromised by malware. In some instances, limited power computing systems, for example, weapon systems, employ integrity checks on program code at a boot time. However, sophisticated malware may be used that can circumvent boot time code compromise verification. In some examples, the integrity checks are not designed to detect a particular virus. Moreover, in some limited power computing systems, implementing additional integrity checks during the boot time may not be possible due to the limited amount of computing resources available on the system.

Systems and methods are described herein for detecting and in some instances removing malware on systems that have a defined amount of processing resources. The systems and methods described herein do not require an elevated amount of processing resources for detection and in some examples removal of the malware. In some examples, a malware detector can be employed on the weapons system or other systems with limited amount of computing power to provide for real-time malware monitoring on such resource constrained platforms.

In some examples, the malware detector can be employed to monitor a system for unwanted memory and/or data changes indicative of malware compromise. The malware detector can be executed during a runtime of program code. The malware detector can employs a program code analyzer, a static data analyzer, and an unused memory location analyzer. Each analyzer of the malware detector can be caused to execute during different instances of time during the runtime of the program code. In some examples, each of the analyzers is executed periodically or a-periodically during the runtime of the program code. The program code analyzer can be configured to evaluate instruction data for executing the program code at a first set of memory locations within the memory for malware in response to being selected by analyzer manager. The static data analyzer can be configured to evaluate static data for use by the program code at a second set of memory locations within the memory for the malware in response to being selected by analyzer manager. The unused memory location analyzer can be configured to evaluate null data indicative of unused memory locations within the memory at a third set of memory locations within the memory storing for the malware in response to being selected by analyzer manager. Each of the analyzers can be configured to generate a malware alert indicative that respective data within corresponding memory locations with the memory has been compromised. The memory can include volatile and non-volatile memory. Because the volatile and the non-volatile memory of the system is monitored by the malware detector for malware attacks, the malware detector can minimize an impact of the malware attack on the system (e.g., reduce a spread of the malware) by reducing an amount of time that is needed to detect the malware.

FIG. 1 is an example of a malware detector 100. The malware detector 100 can be employed on a weapon system, or any system that may have a limited amount of computing power (e.g., for real-time data processing). Thus, in some examples, the malware detector 100 can be employed on an unmanned aerial vehicle (UAV) (e.g., a drone), a satellite system, or a space vehicle. The malware detector 100 can be embodied as machine readable instructions that can be executed by a processor of the weapon system. The malware detector 100 can be configured monitor the weapon system for malware. In some examples, the malware detector 100 can be configured to detect the malware during a runtime of a computer program. By detecting the malware during the runtime of the computer program, the malware detector 100 can alert a user and/or remove the detected malware. By way of example, the computer program can be represented as a program code corresponding to machine readable instructions that can be executed by a processor of the weapon system. In some examples, the program code can correspond to weapon system code for configuring and/or controlling sub-systems of the weapon system for operation. While examples are presented with respect to configuring the weapon system with the malware detector, the examples herein should not be construed and/or limited to only such examples. The malware detector 100 can be used on any system that may be vulnerable to a malware attack (e.g., a cyber-attack).

By way of example, upon initialization of the weapon system, the malware detector 100 can be executed by the processor of the weapon system to monitor and detect for malware on-board the weapon system. The malware detector 100 can include an analyzer manager 102. The analyzer manager 102 can be configured to select one of a program code analyzer 104, a static data analyzer 106, and an unused memory location analyzer 108 based on analyzer execution data 110. The analyzer execution data 110 can identify or determine when each of the program code analyzer 104, the static data analyzer 106, and the unused memory location analyzer 108 are executed during the runtime of the computer program. Thus, the analyzer execution data 110 can characterize a schedule for execution of the program code analyzer 104, the static data analyzer 106, and the unused memory region analyzer 108. In some examples, the analyzer manager 102 can be configured to select the program code analyzer 104 based on the schedule. For example, the schedule can identify instances in time at which the program code analyzer 104 is to cause one of the analyzers 104, 106, and 108 to be executed. In some examples, each of the analyzers 104, 106, and 108 can be executed periodically or a-periodically at different instances in time during the runtime of the computer program.

In some examples, the analyzer execution data 110 can identify a first set of address locations for a first set of memory locations (e.g., address locations) within a memory of the weapon system. The memory of the weapon system can include volatile memory and/or non-volatile memory. In some examples, the first set of memory locations can store instruction data 112. The instruction data 112 stored at the first set of memory locations of the memory can include at least some of the instructions (e.g., central processing unit (CPU) instructions) for executing the computer program. The analyzer manager 102 can be configured to provide the first set of address locations for the first set of memory locations from the analyzer execution data 110 to the program code analyzer 104 for malware evaluation of the instruction data 112 stored at the first set of memory locations within the memory.

The program code analyzer 104 can be configured to evaluate the instruction data 112 stored at the first set of memory locations within the memory to determine whether the first set of memory locations has been compromised by the malware. For example, the program code analyzer 104 can be configured to execute a hash function on the instruction data 112 at the first set of memory locations within the memory, and compare the hash to an expected hash. The expected hash can correspond to a baseline hash for the first set of memory locations within the memory. The term "baseline hash" can be referred to as a "pristine hash" or "golden hash". The baseline hash can be associated with a version of the instruction data 112 at the first set of memory locations during runtime of the computer program that has not been affected by the malware. For example, the baseline hash can be a hash of a set of instructions of the instruction data 112 that does not include one or more instructions embedded by the malware. The program code analyzer 104 can be configured to generate malware alert data 114 in response to determining that the hash of the instruction data 112 at the first set of memory locations within the memory is not equal to the expected hash. Because the malware can embed unwanted instructions into the instruction data 112, the hash of the instruction data 112 will be different from the hash of the instruction data 112 without the embedded unwanted instructions. The malware alert data 114 can provide an alert that the first set of memory locations have been compromised by the malware.

In some examples, the malware alert data 114 can identify the first set of addresses for the first set of memory locations within the memory that have been compromised by the malware. The malware alert data 114 can be provided to the analyzer manager 102. The analyzer manager 102 can be configured to provide the malware alert data 114 to a user to alert the user that the weapon system has been comprised by the malware. In some examples, the analyzer manager 102 can be employed to communicate the malware alert data 114 to an output device (e.g., a computer, a display, etc.), which can be configured to render the malware alert data 114 to alert the user. In some examples, the program code analyzer 104 can be configured to provide the malware alert data 114 to the output device.

In some examples, the analyzer manager 102 can be configured to select the static data analyzer 106 based on the analyzer execution data 110. For example, the schedule of the analyzer execution data 110 can indicate that the static data analyzer 106 is to be executed during the runtime of the computer program. In some examples, the analyzer execution data 110 can identify a second set of address locations for a second set of memory locations within the memory. The second set of memory locations within the memory can be configured to store at least some of static data 116 that may be used by the program code. The static data 116 stored at the second set of memory locations within the memory can include data that does not change during execution of the program code. Thus, the static data 116 can be representative of a collection of data in the memory that can be fixed in size. For example, the static data 116 can include one or more arrays. The analyzer manager 102 can be configured to provide the second set of address locations for the second set of memory locations within the memory from the analyzer execution data 110 to the static data analyzer 106 for malware evaluation of the static data 116 stored at the second set of memory locations within the memory.

The static data analyzer 106 can be configured to evaluate the static data 116 stored at the second set of memory locations within the memory to determine whether the static data 116 stored therein has been compromised by the malware. For example, the static data analyzer 106 can be configured to execute a hash function on the static data 116 at the second set of memory locations within the memory, and compare the hash to an expected hash. The expected hash can correspond to a baseline hash for the second set of memory locations within the memory. The baseline hash can be associated with a version of the static data 116 at the second set of memory locations within the memory that has not been affected by the malware. For example, the baseline hash can be a hash of the static data 116 that does not include the one or more instructions embedded by the malware. The static data analyzer 106 can be configured to generate the malware alert data 114 in response to determining that the hash of the static data 116 at the second set of memory locations within the memory is not equal to the expected hash for the static data 116. Because the malware can embed unwanted instructions into the static data 116, the hash of the static data 116 will be different from the hash of the static data 116 without the embedded unwanted instructions. The malware alert data 114 can provide an alert that the second set of memory locations within the memory have been compromised by the malware. In some examples, the malware alert data 114 can identify the second set of addresses for the second set of memory locations within the memory that have been compromised by the malware.

In some examples, the analyzer manager 102 can be configured to select the unused memory location analyzer 108 based on the analyzer execution data 110. For example, the schedule of the analyzer execution data 110 can indicate that the unused memory location analyzer 108 is to be executed during the runtime of the computer program. In some examples, the analyzer execution data 110 can identify a third set of address locations for a third set of memory locations within the memory. The third set of memory locations within the memory can be configured as unused regions within the memory at which no data is stored during runtime of the program code. In some examples, the unused regions can store null data 118 representative of a null value (e.g., zero or another fixed value) to indicate that no data is stored at the third set of memory locations within the memory. Thus, in some examples, the third set of memory locations can store no data and the storage of no data can be represented by the null data 118.

The analyzer manager 102 can be configured to provide the third set of address locations for the third set of memory locations within the memory from the analyzer execution data 110 to the unused memory location analyzer 108 for malware evaluation of the null data 118 stored at the third set of memory locations within the memory. The unused memory location analyzer 108 can be configured to evaluate the null data 118 stored at the third set of memory locations within the memory to determine whether the null data 118 stored therein has been compromised by the malware. For example, the unused memory location analyzer 108 can be configured to execute a hash function on the null data 118 at the third set of memory locations within the memory, and compare the hash to an expected hash. The expected hash can correspond to a baseline hash for the third set of memory locations within the memory. The baseline hash can be associated with a version of the null data 118 at the third set of memory locations within the memory that has not been affected by the malware. For example, the baseline hash can be a hash of the null data 118 that does not include the one or more instructions embedded by the malware.

The static data analyzer 106 can be configured to generate the malware alert data 114 in response to determining that the hash of the null data 118 at the third set of memory locations within the memory is not equal to the expected hash for the null data 118. Because the malware can embed unwanted instructions into the null data 118, the hash of the null data 118 will be different from the hash of the null data 118 without the embedded unwanted instructions. The malware alert data 114 can provide an alert that the third set of memory locations within the memory have been compromised by the malware. In some examples, the malware alert data 114 can identify the third set of addresses for the third set of memory locations within the memory that have been compromised by the malware.

Accordingly, by employing the malware detector 100 on-board the weapon system, cyber-attacks can be identified before the malware is able to spread and/or impact a performance of the weapon system. Moreover, because the malware detector 100 does not require an elevated amount of processing resources for detection and in some examples removal of the malware, the malware detector can be employed on the weapons system or other systems with limited amount of computing power to provide for real-time malware monitoring on such resource constrained systems.

Figure 2:
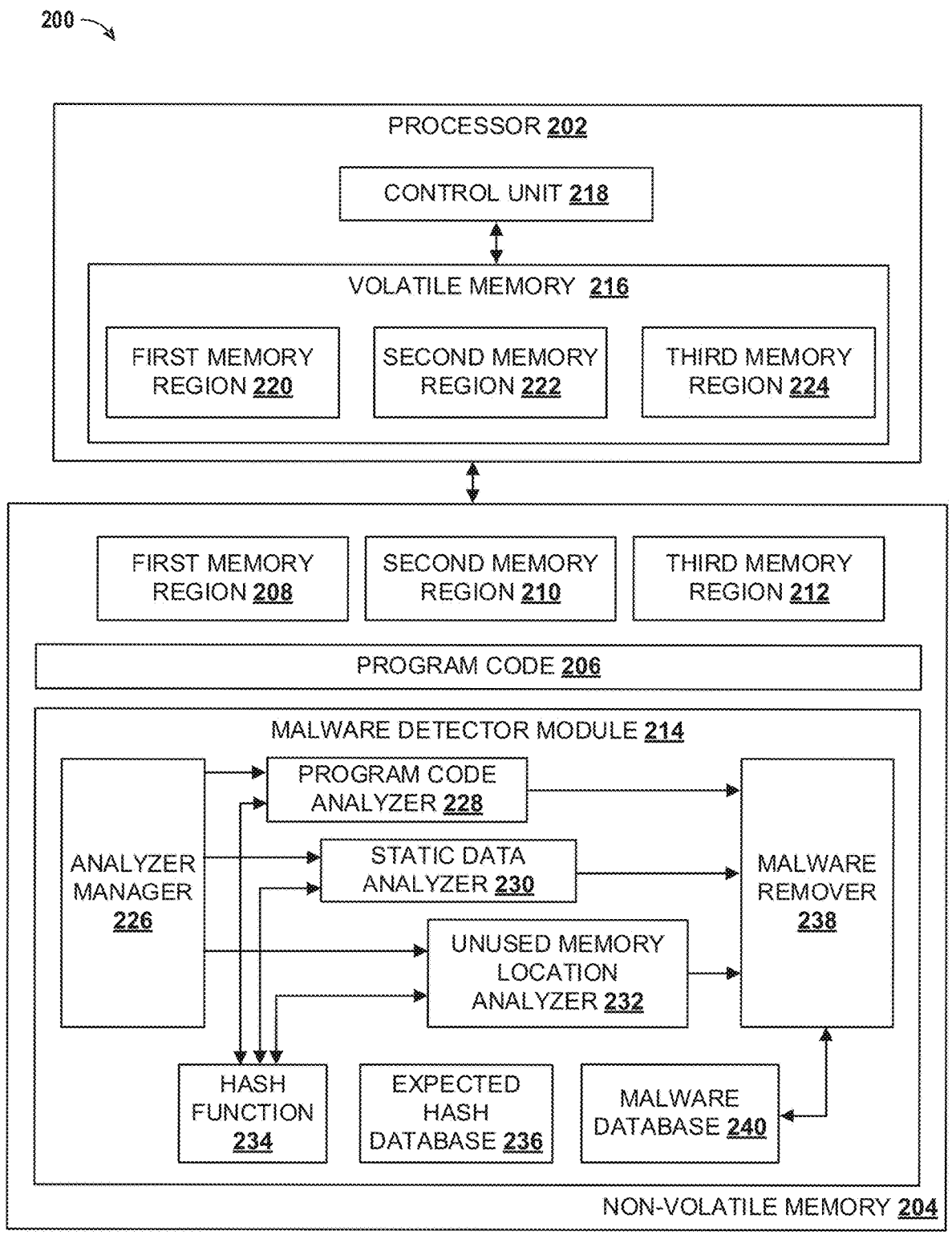
FIG. 2 is an example of a computing system.

FIG. 2 is an example of a computing system 200. In some examples, the computing system 200 can be representative of an on-board system, such that can be used on an aerial vehicle, a satellite, a space vehicle. Thus, in some examples, the computing system 200 can be representative of a processing system that has a limited amount of computing power on a corresponding platform on which the processing system is to be used. The computing system includes a processor 202 and non-volatile memory 204. While the example in FIG. 2 illustrates a single processor and non-volatile memory in other examples, a plurality of processors and non-volatile memories can be used. By way of example, the processor 202 can be one or more processor cores. The non-volatile memory 204 can be one of a hard disk drive, a solid-state drive, a flash memory, or the like. In the present example of FIG. 2, although the components of the computing system are illustrated as being implemented on the same computer system 200, in other examples, the components could be distributed across different systems (e.g., computers, devices, etc.) and communicate, for example, over a network (e.g., a wireless and/or wired network). By way of example, the network can be an avionics bus network (ABN) of an aerial vehicle, such as a manned or an unmanned aerial vehicle.

The non-volatile memory 204 can store machine-readable instructions that can be retrieved and executed by the processor 202 for executing a computer program. By way of example, the computer program can be a weapon computer program, such as for targeting an object (e.g., an aerial vehicle, ground vehicles, ground forces, and the like). The computer program can be stored in the memory as machine-readable instructions and referred to herein as program code 206. The program code 206 can include instruction data that can be used by the processor 202 to execute the computer code. The instruction data can correspond to the instruction data 112, as shown in FIG. 1. The instruction data of the program code 206 can be stored at a first memory region 208 of the non-volatile memory 204. In some examples, the program code 206 can include static data. The static data can correspond to the static data 116, as shown in FIG. 1. In some examples, the static data can be used by the instruction data. For example, one or more instructions of the instruction data can execute a function, a command, and the like based on the static data. In some examples, the static data does not form part of the program code 206. Thus, in some examples, the static data can be used by the computer program corresponding to the instruction data for implementing one or more actions (e.g., functions, commands, and the like). The static data can be stored at a second memory region 210 of the non-volatile memory 204.

In some examples, the non-volatile memory 204 can include a third memory region 212. The third memory region 212 of the non-volatile memory 204 can be representative of unused memory locations with the non-volatile memory 204. In some examples, the third memory region 212 of the non-volatile memory 204 can store null data representative of a null value (e.g., zero or another fixed value) to indicate that no data is stored at the third set of memory locations within the memory. Thus, in some examples, the third memory region 212 of the non-volatile memory 204 can store no data and the storage of no data can be represented by the null data. In some examples, the null data at the third memory region 212 of the non-volatile memory 204 can correspond to the null data 118, as shown in FIG. 1. In some examples, the non-volatile memory 204 can store machine-readable instructions that can be retrieved and executed by the processor 202 for executing a malware detector module 214 for malware evaluation as described herein. The malware detector module 214 can include or correspond to the malware detector 100, as shown in FIG. 1.

In some examples, the processor 202 can include volatile memory 216. By way of example, the volatile memory 216 can be representative of random access memory (RAM). In other examples, the volatile memory 216 can be implemented as a memory module. By way of example, the volatile memory 216 may be implemented as a dual in-line memory module (DIMM). In additional or alternative examples, the volatile memory 216 may be implemented as a double data rate type (DDR) device. Thus, in some examples, the volatile memory 216 can be implemented as a double data rate 3 (DDR3) device, a double data rate 4 (DDR4) device, a low power DDR3 (LPDDR3) device, a low power DDR4 (LPDDR4) device, a Wide I/O 2 (WIO2) device, a high bandwidth memory (HBM) dynamic random-access memory (DRAM) device, a HBM 2 DRAM (HBM2 DRAM) device, a double data rate 5 (DDR5) device or a low power DDR5 (LPDDR5) device (e.g., a mobile DDR device).

In some examples, the processor 202 can include a control unit 218. To execute the computer program, the control unit 218 can be configured to cause at least some of the instruction data from the first memory region 208 of the non-volatile memory 204 to be retrieved. The control unit 218 can be configured to cause the retrieved instruction data to be stored at a first memory region 220 of the volatile memory 216. In some examples, the retrieved instruction data can correspond to the instruction data 112, as shown in FIG. 1. The control unit 218 can be configured to execute the retrieved instruction data at the first memory region 220 to run the computer program. In some examples, during a runtime of the computer program, the control unit 218 can be configured to access the non-volatile memory 204 to execute the machine readable instructions representative of the malware detector module 214. In some examples, during the runtime of the computer program, the control unit 218 can be configured to cause at least some of the static data stored at the second memory region 210 of the non-volatile memory 204 to be retrieved. The control unit 218 can be configured cause the retrieved static data to be stored at a second memory region 222 of the volatile memory 216. In some examples, the retrieved static data can correspond to the static data 116, as shown in FIG. 1. In some examples, the volatile memory 216 can include a third memory region 224. The third memory region 224 of the volatile memory 216 can store null data representative of a null value (e.g., zero or another fixed value) to indicate that no data is stored at the third set of memory locations within the volatile memory 216. Thus, in some examples, the third memory region 224 of the volatile memory 216 can store no data and the storage of no data can be represented by the null data. In some examples, the null data at the third memory region 224 of the volatile memory 216 can correspond to the null data 118, as shown in FIG. 1. In some examples, memory regions as described herein with respect to FIG. 2 can be referred to as memory locations within a corresponding memory. For clarity and brevity purposes other elements of the processor 202 have been omitted, such as an arithmetic/logic unit, registers, buses, etc.

In some examples, during the runtime of the computer program, the control unit 218 can cause the processor 202 to execute the malware detector module 214 to determine whether if any of the first memory regions 208 and 220, the second memory regions 210 and 222, and/or the third memory regions 212 and 224 have been compromised by malwares. Upon execution, the malware detector module 214 can employ an analyzer manager 226. The analyzer manager 226 can be configured similar to the analyzer manager 102, as shown in FIG. 1. The analyzer manager 226 can be programmed to select one of a program code analyzer 228, a static data analyzer 230, and an unused memory location analyzer 232 based on analyzer execution data (e.g., the analyzer execution data 110, as shown in FIG. 1). The program code, static data, and unused memory location analyzers 228, 230, and 232 can correspond to the program code, static data, and unused memory location analyzers 104, 106, and 108, as shown in FIG. 1. The analyzer manager 226 can be programmed to select one of the program code analyzer 228, the static data analyzer 230, and the unused memory location analyzer 232 based the analyzer execution data in a same or similar manner as described herein with respect to FIG. 1. Thus, during the runtime of the computer program, the analyzer manager 226 can be programmed to cause each of the analyzers 228, 230, and 232 to be executed periodically or a-periodically and thus at different instances in time to evaluate the memory regions 208, 210, 212, 220, 222, and 224.

In some examples, the program code analyzer 228 can be programmed to evaluate the instruction data stored at the first memory region 208 within the non-volatile memory 204 to determine whether the instruction data stored therein has been compromised by the malware. For example the program code analyzer 228 can be programmed to invoke a hash function 234 to execute a hash on the instruction data at the first memory region 208, and compare the hash of the instruction data at the first memory region 208 to an expected hash for the instruction data at the first memory region 208. In some examples, the malware detector module 214 can include an expected hash database 236. The expected hash database 236 can identify an expected hash for each memory region the memory regions 208, 210, 212, 220, 222, and 224. Thus, the expected hash database 236 can include expected hash values for each memory region the memory regions 208, 210, 212, 220, 222, and 224 for different instances of time during the runtime of the computer program. Because data in at least some memory regions can change (e.g., in size and/or value) during the runtime of the computer program (e.g., the memory regions 208, 210, 212, 220, 222, and 224), the expected hash database 236 can include different expected hash values for times at which the at least some memory regions is evaluated by the malware detector module 214 for the malware. As described herein, an expect hash for a memory region corresponding to a set of memory locations in memory can correspond to a baseline has for the memory region that is free of embedded instructions and/or data by the malware.

In some examples, the program code analyzer 228 can be programmed to generate malware alert data (e.g., the malware alert data 114, as shown in FIG. 1) in response to determining that the hash of the instruction data at the first memory region 208 is not equal to the expected hash for the instruction data at the first memory region 208. Because the malware can embed unwanted instructions and/or data into the instruction data at the first memory region 208, the hash of the instruction data at the first memory region 208 will be different from the hash of the instruction data at the first memory region 208 without the embedded unwanted instructions and/or data. The malware alert data can provide an alert that the first memory region 208 has been compromised by the malware. In some examples, the malware alert data can identify a location of the first memory region 208 within the non-volatile memory 204.

In some examples, the program code analyzer 228 can be programmed to evaluate the retrieved instruction data stored at the first memory region 220 within the volatile memory 216 to determine whether the retrieved instruction data stored therein has been compromised by the malware in a same or similar manner as described herein with respect to the first memory region 208 of the non-volatile memory 204. Thus, in some examples, the program code analyzer 228 can be programmed to invoke the hash function 234 to execute a hash on the retrieved instruction data at the first memory region 220, and compare the hash of the retrieved instruction data at the first memory region 220 to an expected hash for the retrieved instruction data at the first memory region 220 from the expected hash database 236. In some examples, the program code analyzer 228 can be programmed to generate the malware alert data in response to determining that the hash of the retrieved instruction data at the first memory region 220 is not equal to the expected hash for the retrieved instruction data at the first memory region 220.

In some examples, the static data analyzer 230 can be programmed to evaluate the static data stored at the second memory region 210 within the non-volatile memory 204 to determine whether the static data stored therein has been compromised by the malware. For example the static data analyzer 230 can be programmed to invoke the hash function 234 to execute a hash on the static data at the second memory region 210, and compare the hash of the static data at the second memory region 210 to an expected hash for the static data at the second memory region 210 from the expected hash database 236. In some examples, the static data analyzer 230 can be programmed to generate the malware alert data in response to determining that the hash of the static data at the second memory region 210 is not equal to the expected hash for the static data at the second memory region 210. Because the malware can embed unwanted instructions and/or data into the static data at the second memory region 210, the hash of the static data at the second memory region 210 will be different from the hash of the static data at the second memory region 210 without the embedded unwanted instructions and/or data. The malware alert data can provide an alert that the second memory region 210 has been compromised by the malware. In some examples, the malware alert data can identify a location of the second memory region 210 within the non-volatile memory 204.

In some examples, the static data analyzer 230 can be programmed to evaluate the retrieved static data stored at the second memory region 222 within the volatile memory 216 to determine whether the retrieved static data stored therein has been compromised by the malware in a same or similar manner as described herein with respect to the second memory region 210 of the non-volatile memory 204. Thus, in some examples, the static data analyzer 230 can be programmed to invoke the hash function 234 to execute a hash on the retrieved static data at the second memory region 222, and compare the hash of the retrieved static data at the second memory region 222 to an expected hash for the retrieved static data at the second memory region 222 from the expected hash database 236. In some examples, the static data analyzer 230 can be programmed to generate the malware alert data in response to determining that the hash of the retrieved static data at the second memory region 222 is not equal to the expected hash for the retrieved static data at the second memory region 222.

In some examples, the unused memory location analyzer 232 can be programmed to evaluate the null data stored at the third memory region 212 of the non-volatile memory 204 to determine whether the null data stored therein has been compromised by the malware. For example, the unused memory location analyzer 232 can be programmed to invoke the hash function 234 to execute a hash on the null data at the third memory region 212, and compare the hash of the null data at the third memory region 212 to an expected hash of the null data at the third memory region 212 from the expected hash database 236. In some examples, the unused memory location analyzer 232 can be programmed to generate the malware alert data in response to determining that the hash of the null data at the third memory region 212 is not equal to the expected hash for the null data at the third memory region 212. Because the malware can embed unwanted instructions and/or data into the third memory region 212, the hash of the null data at the third memory region 212 will be different from the hash of the null data at the third memory region 212 without the embedded unwanted instructions and/or data. The malware alert data can provide an alert that the third memory region 212 has been compromised by the malware. In some examples, the malware alert data can identify a location of the third memory region 212 within the non-volatile memory 204.

In some examples, the unused memory location analyzer 232 can be programmed to evaluate the null data stored at the third memory region 224 within the volatile memory 216 to determine whether the null data stored therein has been compromised by the malware in a same or similar manner as described herein with respect to the third memory region 212 of the non-volatile memory 204. Thus, in some examples, the unused memory location analyzer 232 can be programmed to invoke the hash function 234 to execute a hash on the null data at the third memory region 224, and compare the hash of the null data at the third memory region 224 to an expected hash for the null data at the third memory region 224 from the expected hash database 236. In some examples, the unused memory location analyzer 232 can be programmed to generate the malware alert data in response to determining that the hash of the null data at the third memory region 224 is not equal to the expected hash for the null data at the third memory region 224.

In some examples, the malware detector module 214 can include a malware remover 238 that can be programmed to remove the embedded unwanted instructions based on respective addresses identified by the malware alert data provide by at least one of the analyzers 228, 230, and 232. In further examples, the malware remover 238 can be programmed to evaluate the embedded unwanted instructions and/or data to determine a type of malware. For example, the malware remover 238 can be programmed to evaluate the unwanted instructions to determine an action and/or a function that the unwanted instructions are programmed to execute. The malware remover 238 can be programmed to communicate with a malware database 240 identifying different types of malware and instructions for removing a respective malware. Each malware identified in the malware database 240 can be associated with respective actions and/or functions that the respective malware is programmed to execute. The malware remover 238 can be programmed to evaluate the action and/or function of the unwanted instructions relative to the malware database 240 to identify the type of malware. The malware remover 238 can be programmed to employ the instructions for removing the identified malware to remove the malware and thus minimize an impact of the malware on the computing system.

Accordingly, by employing the malware detector module 214 as part of the computing system 200 on-board a weapon system, cyber-attacks can be identified before the malware is able to spread and/or impact a performance of the weapon system. Moreover, because the malware detector module 214 does not require an elevated amount of processing resources for detection and in some examples removal of the malware, the malware detector module 214 can be employed on the weapons system or other systems with limited amount of computing power to provide for real-time malware monitoring and removal on such resource constrained systems.

In view of the foregoing structural and functional features described above, example methods will be better appreciated with references to FIGS. 3-6. While, for purposes of simplicity of explanation, the example methods of FIGS. 3-6 are shown and described as executing serially, it is to be understood and appreciated that the example method is not limited by the illustrated order, as some actions could in other examples occur in different orders, multiple times and/or concurrently from that shown and described herein.

Figure 3:
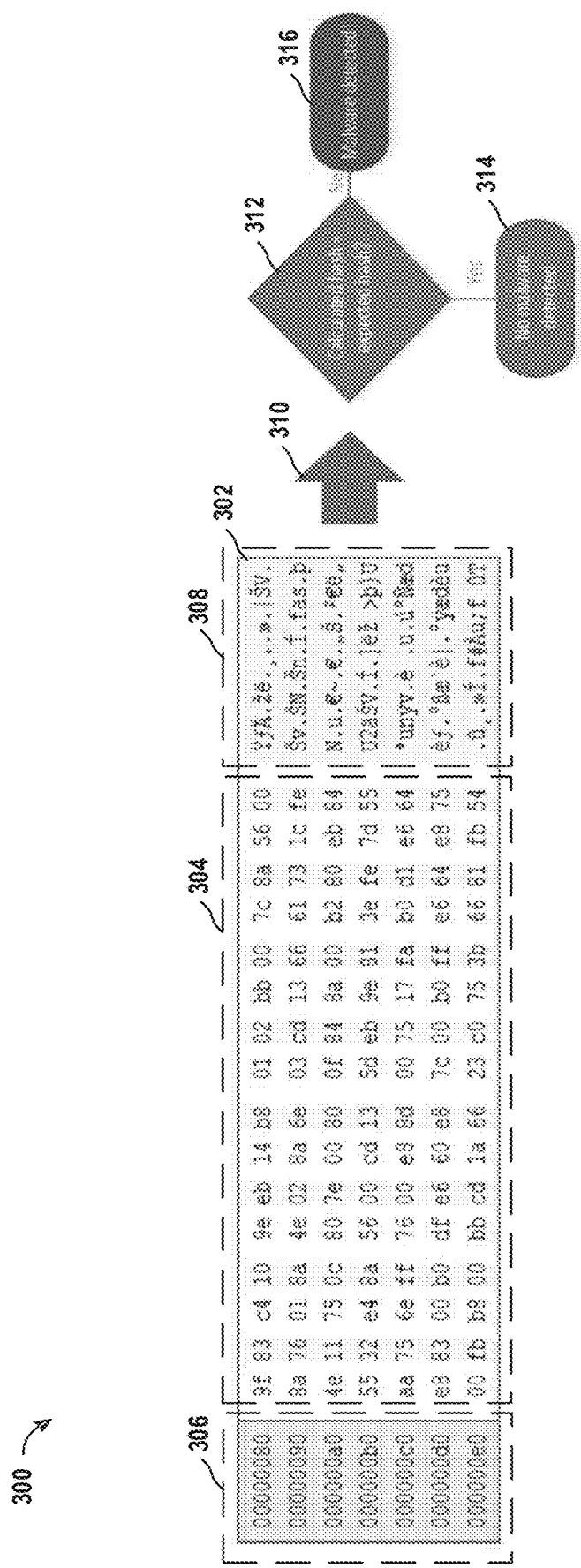
FIG. 3 is an example of a method for detecting malware.

FIG. 3 is an example of a method 300 for detecting malware. The method 300 can be implemented by the malware detector 100, as shown in FIG. 1. Thus, in some examples, references can be made to the examples of FIGS. 1 and 2 in the following description of FIG. 3. The method 300 can begin at 302 by accessing instruction data 304 (e.g., the instruction data 112, as shown in FIG. 1) for executing a program code (e.g., the program code 206, as shown in FIG. 2) at a set of memory locations (e.g., the first memory region 208 and/or 220, as shown in FIG. 2) within memory (e.g., the memory 204 and/or 216, as shown in FIG. 2). By way of example, the instruction data 304 stored at the set of memory locations in the example of FIG. 3 can be represented in hexadecimal form. For example, to access the instruction data 304 at 302, the malware detector can be configured to employ the set of memory addresses 306 associated with the set of memory locations. In some examples, the set of memory locations can store other data (e.g., program data). By way of example, the instruction data 304 can be represented at 308 using Unicode character form.

In some examples, at 310, executing a hash function (e.g., the hash function 234, as shown in FIG. 2) on the instruction data 304. At 312, comparing the hash of the instruction data 304 to an expected hash for the instruction data 304 to determine whether the set of memory locations have been compromised by a malware. In some examples, the method 300 can proceed (shown as "YES" in FIG. 3) to 314 based on the comparison indicating that the hash of the instruction data 304 equals the expected hash for the instruction data 304. At 314, the method 300 can include providing an indication (e.g., to the analyzer manager 102, as shown in FIG. 1) that no malware has been detected at the set of memory locations within the memory. In some examples, the method 300 can proceed (shown as "NO" in FIG. 3) to 316 based on the comparison indicating that the hash of the instruction data 304 does not equal the expected hash for the instruction data 304. At 310, the method 300 can include providing an indication (e.g., to the analyzer manager 102, as shown in FIG. 1) that one malware has been detected at the set of memory locations within the memory. By way of example, the indication of malware can correspond to the malware alert data 114, as shown in FIG. 1.

Figure 4:
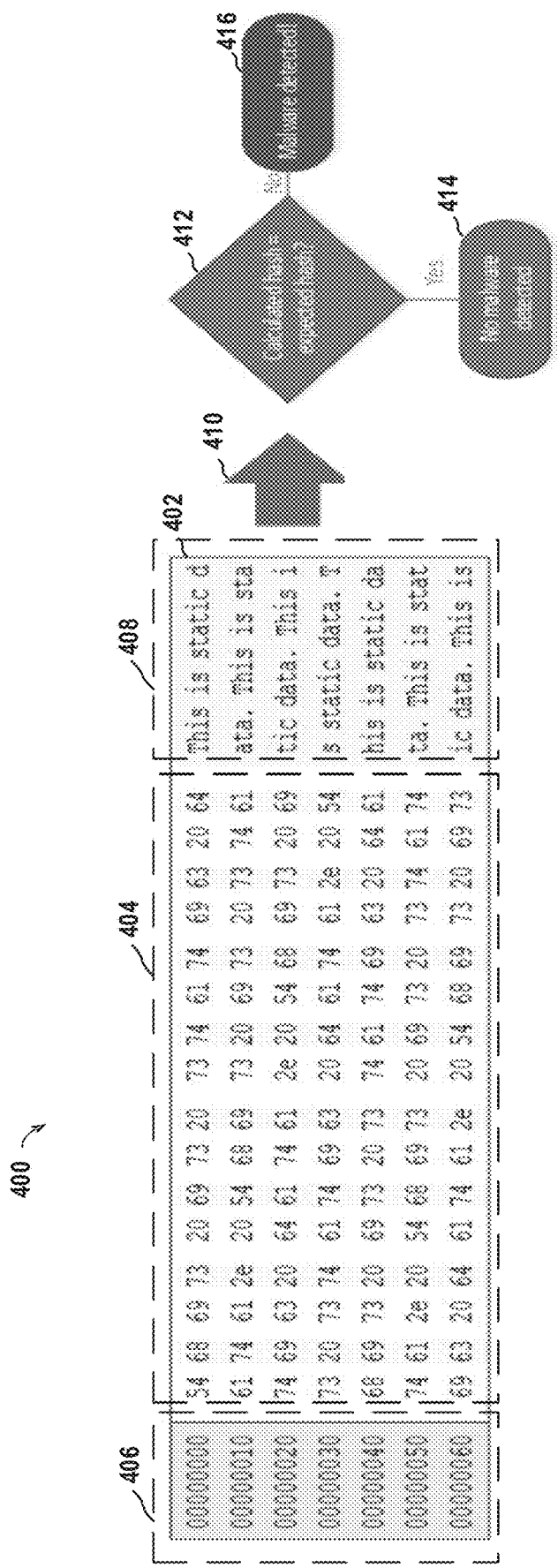
FIG. 4 is another example of a method for detecting malware.

FIG. 4 is another example of a method 400 for detecting malware. The method 400 can be implemented by the malware detector 100, as shown in FIG. 1. Thus, in some examples, references can be made to the examples of FIGS. 1 and 2 in the following description of FIG. 4. The method 400 can begin at 402 by accessing static data 404 (e.g., the static data 116, as shown in FIG. 1) for use by a program code (e.g., the program code 206, as shown in FIG. 2) at a set of memory locations (e.g., the second memory region 210 and/or 222, as shown in FIG. 2) within memory (e.g., the memory 204 and/or 216, as shown in FIG. 2). By way of example, the static data 404 stored at the set of memory locations in the example of FIG. 4 can be represented in hexadecimal form. For example, to access the static data 404 at 402, the malware detector can be configured to employ the set of memory addresses 406 associated with the set of memory locations. In some examples, the set of memory locations can store other data (e.g., program data). By way of example, the static data 404 can be represented at 408 using Unicode character form.

At 410, executing a hash function (e.g., the hash function 234, as shown in FIG. 2) on the static data 404 at the set of memory locations within the memory. At 412, comparing the hash of the static data 404 to an expected hash for the static data 404 to determine whether the set of memory locations have been compromised by a malware. In some examples, the method 400 can proceed (shown as "YES" in FIG. 4) to 414 based on the comparison indicating that the hash of the static data 404 equals the expected hash for the static data 404. At 414, the method 400 can include providing an indication (e.g., to the analyzer manager 102, as shown in FIG. 1) that no malware has been detected at the set of memory locations within the memory. In some examples, the method 400 can proceed (shown as "NO" in FIG. 4) to 416 based on the comparison indicating that the hash of the static data 404 does not equal the expected hash for the static data 404. At 416, the method 400 can include providing an indication (e.g., to the analyzer manager 102, as shown in FIG. 1) that malware has been detected at the set of memory locations within the memory. By way of example, the indication of malware at the set of memory locations within the memory can correspond to the malware alert data 114, as shown in FIG. 1.

Figure 5:
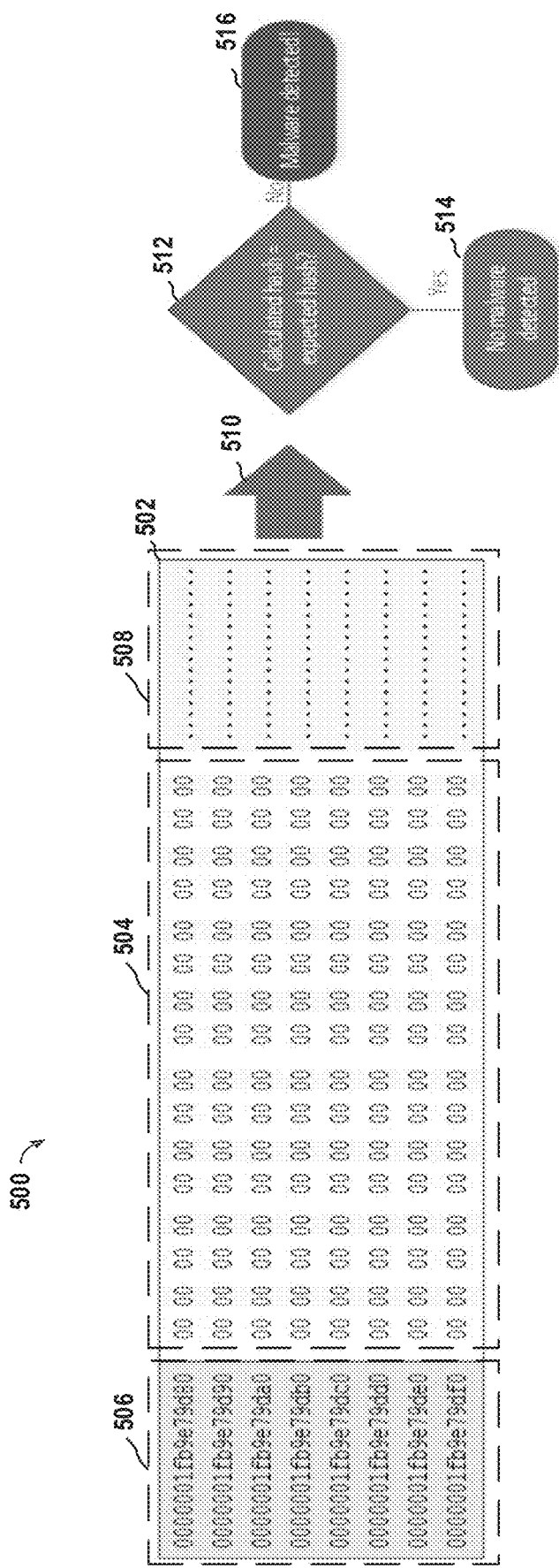
FIG. 5 is yet another example of a method for detecting malware.

FIG. 5 is yet another example of a method 500 for detecting malware. The method 500 can be implemented by the malware detector 100, as shown in FIG. 1. Thus, in some examples, references can be made to the examples of FIGS. 1 and 2 in the following description of FIG. 5. The method 500 can begin at 502 by accessing null data 504 (e.g., the null data 118, as shown in FIG. 1) at a set of memory locations (e.g., the third memory region 212 and/or 224, as shown in FIG. 2) within memory (e.g., the memory 204 and/or 216, as shown in FIG. 2). By way of example, the null data 504 stored at the set of memory locations in the example of FIG. 4 can be represented in hexadecimal form. For example, to access the null data 504 at 502, the malware detector can be configured to employ the set of memory addresses 506 associated with the set of memory locations. By way of example, the null data 504 can be represented at 508 using Unicode character form.

At 510, executing a hash function (e.g., the hash function 234, as shown in FIG. 2) on the null data 504 at the set of memory locations within the memory. At 512, comparing the hash of the null data 504 to an expected hash for the null data 504 to determine whether the set of memory locations have been compromised by a malware. In some examples, the method 500 can proceed (shown as "YES" in FIG. 5) to 514 based on the comparison indicating that the hash of the null data 504 equals the expected hash for the null data 504. At 508, the method 500 can include providing an indication (e.g., to the analyzer manager 102, as shown in FIG. 1) that no malware has been detected at the set of memory locations within the memory. In some examples, the method 500 can proceed (shown as "NO" in FIG. 5) to 514 based on the comparison indicating that the hash of the null data 504 does not equal the expected hash for the null data 504. At 516, the method 500 can include providing an indication (e.g., to the analyzer manager 102, as shown in FIG. 1) that malware has been detected at the set of memory locations within the memory. By way of example, the indication of malware at the set of memory locations within the memory can correspond to the malware alert data 114, as shown in FIG. 1.

Figure 6:
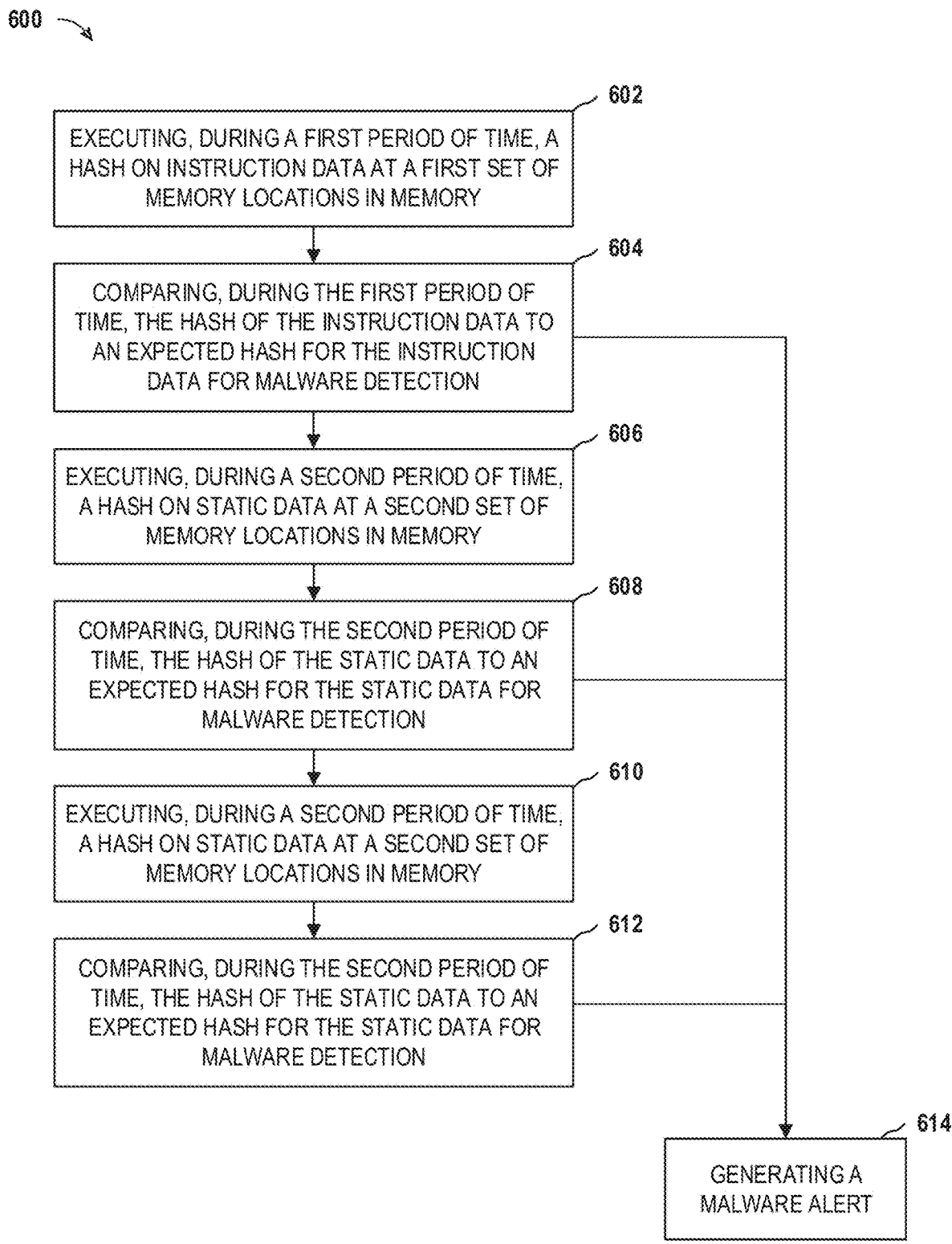
FIG. 6 is another example of a method for detecting malware.

FIG. 6 is another example of a method 600 for detecting malware. The method 600 can be implemented by the malware detector 100, as shown in FIG. 1. Thus, in some examples, references can be made to the examples of FIGS. 1 and 2 in the following description of FIG. 6. The method 600 can begin at 602 by executing during a first period of time a hash function (e.g., the hash function 234, as shown in FIG. 2) on instruction data (e.g., the instruction data 112, as shown in FIG. 1) for executing a program code (e.g., the program code 206, as shown in FIG. 2). The instruction data can be stored at a first set of memory locations (e.g., the first memory region 208 and/or 220, as shown in FIG. 2) with a memory (e.g., the memory 204 and/or 206, as shown in FIG. 2). At 604, comparing, during the first period of time, the hash of the instruction data to an expected hash for the instruction data to determine whether the first set of memory locations have been compromised by the malware.

At 606, executing, during a second period of time, a hash function (e.g., the hash function 234, as shown in FIG. 2) on static data for use by the program code. The static data can be stored at a second set of memory locations (e.g., the second memory region 210 and/or 222, as shown in FIG. 2) with the memory. At 608, comparing, during the second period of time, the hash of the static data to an expected hash for the static data to determine whether the second set of memory locations have been compromised by the malware. At 610, executing, during a third period of time, a hash function (e.g., the hash function 234, as shown in FIG. 2) on null data indicative of unused memory locations within the memory. The null data can be stored at a third set of memory locations (e.g., the third memory region 212 and/or 224, as shown in FIG. 2) with the memory. At 612, comparing, during the third period of time, the hash of the null data to an expected hash for the null data to determine whether the third set of memory locations have been compromised by the malware.

In some examples, at 614 a first malware alert identifying a first set of address locations for the first set of memory locations can be generated in response to determining that the hash of the instruction data is not equal to the expected hash for the instruction data. In some examples, at 614, a second malware alert identifying a second set of address locations for the second set of memory locations can be generated in response to determining that the hash of the static data is not equal to the expected hash for the static data. In some examples, at 614, a third malware alert identifying a third set of address locations for the third set of memory locations can be generated in response to determining that the hash of the null data is not equal to the expected hash for the null data.

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. A malware detector comprising one or more non-transitory computer-readable media having computer-readable program code stored thereon, the computer readable program code comprising:
    an analyzer manager configured to select one of a program code analyzer, a static data analyzer, and an unused memory location analyzer for malware detection within memory of a system based on analyzer execution data, the analyzer execution data characterizing a schedule for execution of the program code, the static data, and the unused memory location analyzers during runtime of a computer program,
    the program code analyzer being executed to:
        evaluate instruction data for executing the computer program at a first set of memory locations within the memory storing for malware in response to being selected by analyzer manager,
        execute a hash function on the instruction data at the first set of memory locations within the memory, and
        compare the hash of the instruction data at the first set of memory locations within the memory to an expected hash for the instruction data at the first set of memory locations within the memory to determine whether the first set of memory locations have been compromised by the malware,
    the static data analyzer being executed to:
        evaluate static data for use by the computer program at a second set of memory locations within the memory for the malware in response to being selected by the analyzer manager,
        execute a hash function on the static data at the second set of memory locations within the memory, and
        compare the hash of the static data at the second set of memory locations within the memory to an expected hash for the static data at the second set of memory locations within the memory to determine whether the second set of memory locations have been compromised by the malware, and
    the unused memory location analyzer being executed to evaluate null data indicative of unused memory locations at a third set of memory locations within the memory for the malware in response to being selected by the analyzer manager.

2. The malware detector of claim 1, wherein the program code analyzer is configured to generate malware alert data in response to determining that the hash of the instruction data at the first set of memory locations within the memory is not equal to the expected hash for the instruction data at the first set of memory locations within the memory, the malware alert data identifying address locations for the first set of memory locations.

3. The malware detector of claim 1, wherein the static data analyzer is configured to generate malware alert data in response to determining that the hash of the static data at the second set of memory locations within the memory is not equal to the expected hash for the static data at the second set of memory locations within the memory, the malware alert data identifying address locations for the second set of memory locations.

4. The malware detector of claim 1, wherein the unused memory location analyzer is configured to execute a hash function on the null data at the third set of memory locations within the memory and compare the hash of the null data at the third set of memory locations within the memory to an expected hash for the null data at the third set of memory locations within the memory to determine whether the third set of memory locations have been compromised by the malware.

5. The malware detector of claim 4, wherein the static data analyzer is configured to generate malware alert data in response to determining that the hash of the null data at the third set of memory locations within the memory is not equal to the expected hash for the null data at the third set of memory locations within the memory, the malware alert data identifying address locations for the third set of memory locations.

6. The malware detector of claim 4, wherein the memory includes volatile and non-volatile memory.

7. The malware detector of claim 6, wherein the volatile memory includes a first subset of the first set of memory locations and the non-volatile memory includes a second subset of the first set of memory locations.

8. The malware detector of claim 7, wherein the volatile memory includes a first subset of the second set of memory locations and the non-volatile memory includes a second subset of the second set of memory locations.

9. The malware detector of claim 8, wherein the volatile memory includes a first subset of the third set of memory locations and the non-volatile memory includes a second subset of the third set of memory locations.

10. The malware detector of claim 9, wherein the system is a weapons system.

11. A system comprising:
    memory to store machine readable instructions and analyzer execution data characterizing a schedule for execution of program code, static data, and unused memory location analyzers during runtime of a computer program; and
    one or more processors to access the memory and execute the machine readable instructions, the machine readable instructions comprising:
        an analyzer manager programmed to select one of the program code analyzer, the static data analyzer, and the unused memory location analyzer for malware detection within the memory based on analyzer execution data,
        the program code analyzer being programmed to:
            evaluate instruction data for executing the computer program at a first set of memory locations within the memory for malware in response to being selected by the analyzer manager,
            execute a hash function on the instruction data at the first set of memory locations within the memory, and
            compare the hash of the instruction data at the first set of memory locations within the memory to an expected hash for the instruction data at the first set of memory locations within the memory to determine whether the first set of memory locations have been compromised by the malware, the static data analyzer being programmed to:
evaluate static data for use by the computer program at a second set of memory locations within the memory for the malware in response to being selected by the analyzer manager,
execute a hash function on the static data at the second set of memory locations within the memory, and
compare the hash of the static data at the second set of memory locations within the memory to an expected hash for the static data at the second set of memory locations within the memory to determine whether the second set of memory locations have been compromised by the malware, and the unused memory location analyzer being programmed to evaluate null data indicative of unused memory locations at a third set of memory locations within the memory for the malware in response to being selected by the analyzer manager.

12. The system of claim 11, wherein the unused memory location analyzer is programmed to:
execute a hash function on the null data at the third set of memory locations within the memory; and
compare the hash of the null data at the third set of memory locations within the memory to an expected hash for the null data at the third set of memory locations within the memory to determine whether the third set of memory locations have been compromised by the malware.

13. The system of claim 12, wherein the memory includes volatile and non-volatile memory, the volatile memory includes a first subset of the first set of memory locations and the non-volatile memory includes a second subset of the first set of memory locations, the volatile memory includes a first subset of the second set of memory locations and the non-volatile memory includes a second subset of the second set of memory locations, and the volatile memory includes a first subset of the third set of memory locations and the non-volatile memory includes a second subset of the third set of memory locations, wherein the system is a weapons system.

* * * * *